(12) United States Patent
Park et al.

(10) Patent No.: US 11,846,950 B2
(45) Date of Patent: *Dec. 19, 2023

(54) MOBILE ROBOT AND CONTROL METHOD THEREOF

(71) Applicant: LG ELECTRONICS INC., Seoul (KR)

(72) Inventors: Sangyeol Park, Seoul (KR); Jaewon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

This patent is subject to a terminal disclaimer.

(21) Appl. No.: 17/585,858

(22) Filed: Jan. 27, 2022

(65) Prior Publication Data

US 2022/0236740 A1 Jul. 28, 2022

Related U.S. Application Data

(63) Continuation of application No. 16/490,796, filed as application No. PCT/KR2018/002538 on Mar. 2, 2018, now Pat. No. 11,269,343.

(30) Foreign Application Priority Data

Mar. 3, 2017 (KR) .................. 10-2017-0027845

(51) Int. Cl.
  *G05D 1/02* (2020.01)
  *B25J 9/16* (2006.01)
  (Continued)

(52) U.S. Cl.
  CPC .......... *G05D 1/0246* (2013.01); *B25J 9/1666* (2013.01); *B25J 11/0085* (2013.01);
  (Continued)

(58) Field of Classification Search
  CPC .... B25J 9/1666; B25J 11/0085; B25J 19/023; G05D 1/0238; G05D 1/0253; G05D 2201/0203
  See application file for complete search history.

(56) References Cited

U.S. PATENT DOCUMENTS 9,840,003 B2 12/2017 Szatmary
10,078,892 B1 9/2018 Wang
(Continued)

FOREIGN PATENT DOCUMENTS

JP 2005-312893 11/2005
JP 2009-136968 6/2009
(Continued)

OTHER PUBLICATIONS

European Search Report dated Nov. 6, 2020 issued in Application No. 18761156.1.
(Continued)

*Primary Examiner* — Kira Nguyen
(74) *Attorney, Agent, or Firm* — KED & Associates LLP

(57) ABSTRACT

The present invention relates to a moving robot and a control method thereof, and includes a sensor unit configured to detect an obstacle located in a traveling direction; a camera configured to photograph the obstacle, when the obstacle is detected by the sensor unit; a controller configured to control a certain operation to be performed in accordance with the obstacle. The controller analyzes a plurality of image data of the obstacle inputted from the camera to determine whether the obstacle can be identified and filters the image data, transmits the filtered image data among the plurality of image data to the server through the communication unit, and controls the traveling unit in accordance with obstacle information received from the server. Hence, by transmitting only recognizable image, unnecessary data transmission is reduced, and accordingly, transmission traffic is reduced and (Continued)

the load of image processing of the server is reduced. As the load of the server decreases, the obstacle can be quickly determined, and accordingly, the moving robot can recognize the obstacle in a short time and determine the type of the obstacle to cope with, thereby performing the operation suitable for the feature of the obstacle, the cleaning area, or the surrounding environment.

18 Claims, 11 Drawing Sheets

(51) Int. Cl.
    *B25J 11/00*     (2006.01)
    *B25J 19/02*     (2006.01)
    *G06V 10/75*     (2022.01)
    *G06V 20/10*     (2022.01)

(52) U.S. Cl.
    CPC .......... *B25J 19/023* (2013.01); *G05D 1/0238* (2013.01); *G05D 1/0253* (2013.01); *G06V 10/751* (2022.01); *G06V 20/10* (2022.01); *G05D 2201/0203* (2013.01)

(56) References Cited

U.S. PATENT DOCUMENTS

| | | |
|---|---|---|
| 2002/0153855 A1 | 10/2002 | Song |
| 2005/0110960 A1 | 5/2005 | Mao |
| 2010/0004784 A1 | 1/2010 | Chang et al. |
| 2012/0191287 A1 | 7/2012 | Shin |
| 2012/0200725 A1 | 8/2012 | Albu |
| 2016/0039358 A1 | 2/2016 | Okuda |
| 2016/0167226 A1 | 6/2016 | Schnittman |
| 2016/0278599 A1* | 9/2016 | Seo .................. G08C 17/02 |
| 2016/0302639 A1* | 10/2016 | Lindhé ................ A47L 9/009 |
| 2016/0313741 A1* | 10/2016 | Lindhe ................ G05D 1/0274 |
| 2017/0090456 A1 | 3/2017 | Mao |
| 2018/0050634 A1 | 2/2018 | White |
| 2018/0181141 A1* | 6/2018 | Hsu .................. G05D 1/0248 |

FOREIGN PATENT DOCUMENTS

| | | |
|---|---|---|
| KR | 10-2002-0080898 | 10/2002 |
| KR | 10-0776805 | 11/2007 |
| KR | 10-0834577 | 6/2008 |
| KR | 10-2011-0011424 | 2/2011 |
| KR | 10-1049155 | 7/2011 |
| KR | 10-2017-0014361 | 2/2017 |

OTHER PUBLICATIONS

Korean Notice of Allowance dated Jun. 2, 2019 issued in Application No. 10-2017-0027845.
International Search Report dated Jul. 4, 2018 issued in Application No. PCT/KR2018/002538.
United States Office Action dated Jun. 10, 2021 issued in U.S. Appl. No. 16/490,796.
United States Notice of Allowance dated Nov. 4, 2021 issued in U.S. Appl. No. 16/490,796.

* cited by examiner (a)

(b)

(c)

(d)

(a)

(b)

(a)

(b)

(a)

(b)

(c)

(d)

MOBILE ROBOT AND CONTROL METHOD THEREOF

CROSS-REFERENCE TO RELATED PATENT APPLICATIONS

This application is a Continuation of U.S. application Ser. No. 16/490,796, filed Sep. 3, 2019, which is a U.S. National Stage Application under 35 U.S.C. § 371 of PCT Application No. PCT/KR2018/002538, filed Mar. 2, 2018, which claims priority to Korean Patent Application No. 10-2017-0027845, filed Mar. 3, 2017, whose entire disclosures are hereby incorporated by reference.

TECHNICAL FIELD

The present invention relates to a moving robot and a control method thereof, and more particularly, to a moving robot that travels by detecting an obstacle, and a control method thereof.

BACKGROUND ART

A moving robot is an apparatus that automatically cleans by sucking foreign matter such as dust from the floor while traveling by itself an area to be cleaned.

The moving robot is equipped with a rechargeable battery. Thus, the moving robot can freely move and can move by itself by using an operation power of the battery, and perform cleaning by sucking foreign matter on the floor during movement.

The moving robot detects the distance to obstacle such as furniture, office supplies, and wall placed in a traveling zone, and controls the drive of the left and right wheels to perform obstacle avoidance operation. The moving robot is configured to return to a charging stand if necessary and charge the battery.

When the conventional moving robot detects an obstacle on a traveling path, the moving robot changes the traveling path to avoid the obstacle.

In addition, when the moving robot is performing cleaning, the moving robot may change the path after approaching the obstacle within a certain distance, or change the path after colliding with the obstacle. If the path is changed immediately when an obstacle is detected, a corresponding area cannot be cleaned. Thus, the path is changed, after approaching the obstacle as much as possible or colliding with the obstacle.

When colliding with the obstacle, the obstacle may be broken according to the type of obstacle. In addition, an obstacle to be avoided exits before approaching, but it is difficult for the moving robot to quickly determine the obstacle because it takes time to calculate an image data. In addition, there is a case in which the photographed image is dark according to the lighting condition so that the obstacle cannot be accurately determined.

DISCLOSURE

Technical Problem

The present invention has been made in view of the above problems, and provides a moving robot which operates according to a type of a detected obstacle while performing cleaning, and a control method thereof.

Technical Solution

In an aspect, there is provided a moving robot, including: a sensor unit configured to be provided at a front side of a main body, and to detect an obstacle located in a traveling direction; a camera configured to photograph the obstacle, when the obstacle is detected by the sensor unit; a controller configured to control a certain operation to be performed in accordance with the obstacle; a traveling unit configured to perform a designated operation according to a control command of the controller; and a communication unit configured to communicate with a server, wherein the controller analyzes a plurality of image data of the obstacle inputted from the camera to determine whether the obstacle can be identified and filters the image data, transmits the filtered image data among the plurality of image data to the server through the communication unit, and controls the traveling unit in accordance with obstacle information received from the server.

The controller includes: a traveling control unit configured to control the traveling unit in accordance with the obstacle information; and an obstacle recognition unit configured to analyze the image data to determine whether the obstacle can be identified, and filter the image data.

The obstacle recognition unit determines whether the obstacle can be identified in accordance with a brightness and a sharpness of the image data, and filters the image data.

The obstacle recognition unit determines that the image data is normal data, when the brightness of the image data is greater than a first reference value and less than a second reference value, determines that the image data is unidentifiable data due to underexposure when the brightness of the image data is less than or equal to the first reference value, and determines that the image data is unidentifiable data due to overexposure when the brightness of the image data is greater than or equal to the second reference value.

The obstacle recognition unit calculates an average of brightness value of a plurality of pixels included in the image data and compares the average with the first reference value and the second reference value.

The obstacle recognition unit determines that the image data is normal data, when the sharpness of the image data is greater than a third reference value and less than a fourth reference value, and determines that the image data is unidentifiable data as the image data is an unfocused image or a shaken image, when the sharpness of the image data is less than or equal to the third reference value or more than or equal to the fourth reference value.

The obstacle recognition unit determines whether the obstacle is a dangerous obstacle in accordance with the obstacle information, and the traveling control unit allows the moving robot to avoid the obstacle by setting a traveling path so as not to approach the obstacle more than a certain distance, when the obstacle is a dangerous obstacle.

When the obstacle is detected by the sensor unit, the traveling control unit controls the traveling unit to reduce the traveling speed of the main body or to stop for a certain time.

The obstacle recognition unit determines that the image data is unidentifiable data, when the image data is photographed through the camera in a state where a traveling speed of the main body is equal to or more than a reference speed.

In another aspect, there is provided a method of controlling a moving robot, including: detecting an obstacle, while the main body travels a designated traveling zone and performs cleaning; photographing the obstacle through a camera, when the obstacle is detected; analyzing image data of the obstacle to determine whether the obstacle can be identified; transmitting the image data to a server, when the image data is normal so that the obstacle can be identified; and performing a designated operation for the obstacle, in accordance with obstacle information, when the obstacle information is received from the server.

Advantageous Effects

The moving robot and the control method thereof according to the present invention, when detecting an obstacle, if the obstacle is detected, photographs and transmits the obstacle, analyzes the accumulated image data of the obstacle to determine the type of the obstacle, and thus performs a different operation depending on the type of obstacle, thereby effectively coping with the obstacle, and improving the cleaning efficiency.

The present invention, when photographing an obstacle, photographs a plurality of number of times immediately after an obstacle is detected, filters the photographed image data and transmits to a server, so that only recognizable image can be transmitted, thereby reducing transmission traffic as unnecessary data transmission is reduced and reducing the load due to the image processing of the server.

In addition, the present invention prevents unnecessary data transmission, and can quickly determine the obstacle as the load of the server decreases. Accordingly, the moving robot recognizes the obstacle in a short time, determines the type of the obstacle to cope with it, and can perform the operation suitable for the feature of the obstacle, the cleaning area, or the surrounding environment.

MODE FOR INVENTION

Figure 1:
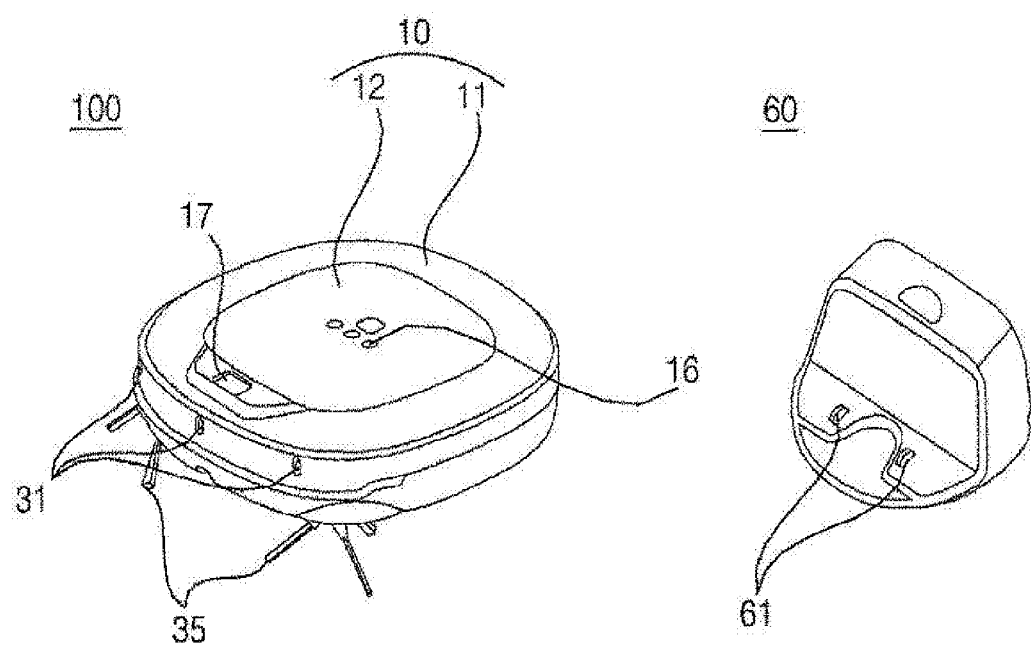
FIG. 1 is a perspective view illustrating a moving robot and a charging stand for charging the moving robot according to an embodiment of the present invention.

Hereinafter, preferred embodiments of the present invention will be described with reference to the accompanying drawings. In describing the present embodiment, the same designations and the same reference numerals are used for the same components, and further description thereof will be omitted.

Hereinafter, embodiments of the present invention will be described in detail with reference to the accompanying drawings.

Figure 2:
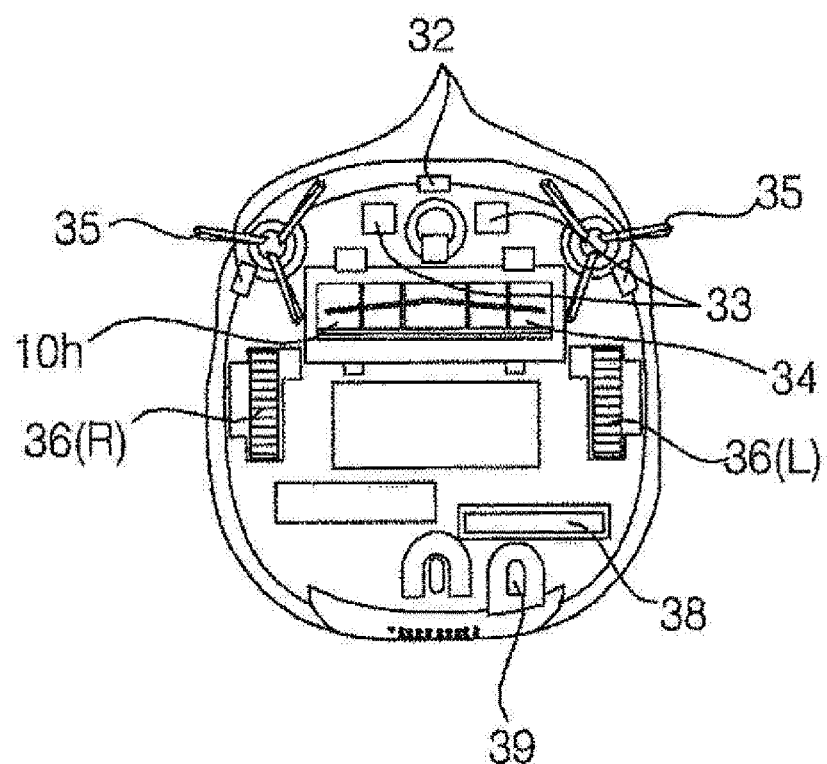
FIG. 2 is a view illustrating a bottom portion of the moving robot shown in FIG. 1.

FIG. 1 is a perspective view illustrating a moving robot and a charging stand for charging the moving robot according to an embodiment of the present invention, and FIG. 2 is a view illustrating a bottom portion of the moving robot shown in FIG. 1.

As shown in FIGS. 1 and 2, referring to FIGS. 1 to 4, a moving robot 100 according to an embodiment of the present invention includes a main body 10 that moves along the floor of a cleaning area and sucks foreign matter such as dust on the floor, and an obstacle detection unit that is disposed in the front surface of the main body 10 to detect an obstacle.

The main body 10 has a casing 11 that forms an outer shape and forms a space which accommodates components constituting the main body 10 therein, a suction unit 34 which is disposed in the casing 11 and sucks foreign matter such as dust or garbage, and a left wheel 36(L) and a right wheel 36(R) rotatably provided in the casing 11. As the left wheel 36(L) and the right wheel 36(R) rotate, the main body 10 moves along the floor of the cleaning area, and in this process, foreign matter is sucked through the suction unit 34.

The suction unit 34 may include a suction fan (not shown) generating a suction force and a suction port 10h through which airflow generated by the rotation of the suction fan is sucked. The suction unit 34 may include a filter (not shown) that collects foreign matters from the airflow sucked through the suction port 10h, and a foreign matter collecting container (not shown) in which foreign matters collected by the filter are accumulated.

In addition, the main body 10 may include a traveling unit for driving the left wheel 36(L) and the right wheel 36(R). The traveling unit may include at least one driving motor. The at least one driving motor may include a left wheel driving motor for rotating the left wheel 36(L) and a right wheel driving motor for rotating the right wheel 36(R).

The operation of the left wheel driving motor and the right wheel driving motor may be independently controlled by a traveling control unit, so that the straight traveling, the backward traveling, or turning of the main body 10 may be achieved. For example, when the main body 10 travels straight, the left wheel driving motor and the right wheel driving motor rotate in the same direction. However, when the left wheel driving motor and the right wheel driving motor rotate at a different speed or rotate in opposite directions, the traveling direction of the main body 10 may be switched. At least one auxiliary wheel 37 may be further provided to stably support the main body 10.

A plurality of brushes 35, which are located in the front side of the bottom portion of the casing 11 and have plumage formed of a plurality of radially extending feathers, may be further provided. The dusts may be removed from the floor of the cleaning area by the rotation of the brushes 35, so that the dusts separated from the floor may be sucked through the suction port 10h and gathered in a collecting container.

The upper surface of the casing 11 may be provided with a control panel including an input unit 16 for receiving various commands for the turn on/off or control of the moving robot 100 from a user. In addition, the moving robot 100 may include an output unit (not shown) to display reservation information, a battery state, an operation mode, an operation state, an error state, and the like.

The obstacle detection unit includes a sensor unit 31 for detecting an obstacle by using a plurality of sensors and an image acquisition unit 17 for photographing an image. The image acquisition unit photographs a traveling zone, and may include a digital camera.

The image acquisition unit 17 may be disposed in the upper surface of the main body to face the ceiling, and may be disposed in the front surface of the main body to face the front. The position and the photographing range of the image acquisition unit 17 is not necessarily limited thereto. In some cases, any one image acquisition unit may be provided, or both image acquisition units facing the front and the ceiling may be provided.

In addition, the obstacle detection unit may further include an obstacle detection unit (not shown) disposed in the front surface of the main body 10 to detect an obstacle through an image photographed by irradiating an optical pattern.

The main body 10 includes a rechargeable battery 38. A charging terminal 33 of the battery 38 may be connected to a commercial power source (e.g., a power outlet in a home), or a separate charging stand 60 connected to the commercial power source may be docked to the main body 10, so that the charging terminal 33 is electrically connected to the commercial power source through contact with a terminal 61 of the charging stand, thereby charging the battery 38. The electrical components constituting the moving robot 100 may be supplied with power from the battery 38. Thus, the moving robot 100 is able to autonomously travel in a state in which the moving robot 100 is electrically disconnected from the commercial power source while the battery 38 is charged.

Figure 3:
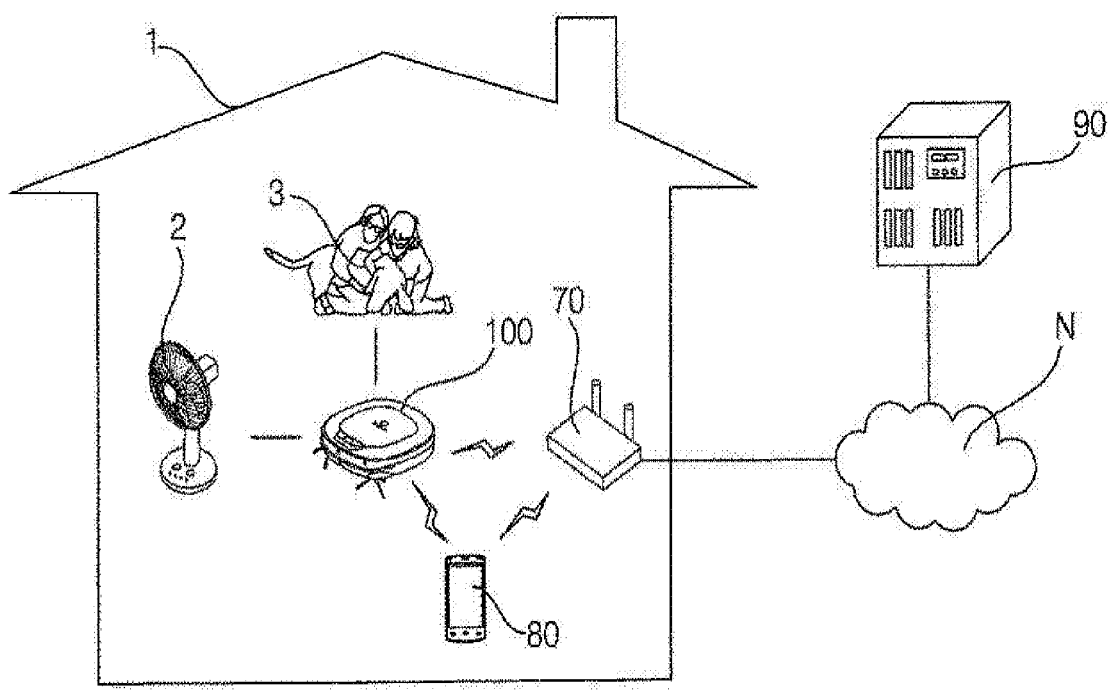
FIG. 3 is a view schematically illustrating a moving robot and a system according to an embodiment of the present invention.

FIG. 3 is a view schematically illustrating a moving robot and a system according to an embodiment of the present invention.

The moving robot 100 is connected to a server 90 to determine the type of obstacle. In addition, the moving robot 100 may be connected to a terminal 80 to which a cleaning command is inputted.

The moving robot 100 may detect a plurality of obstacles 11 and 12 existing in an indoor area 1 to recognize the obstacle, and perform any one of approaching, passing, and avoiding according to the type of the obstacle. In this case, the moving robot 100 may avoid the obstacle without approaching an obstacle, or may perform a certain operation after approaching a certain distance and may avoid the obstacle after approaching the obstacle, and may pass an obstacle according to the shape of the obstacle.

The moving robot 100 communicates with the terminal 80 to receive setting data for the indoor area 1, and to receive a cleaning command for a certain cleaning area of the indoor area 1 to perform cleaning.

When detecting the obstacle, the moving robot 100 photographs the obstacle and transmits obstacle data to the server 90, determines the type of the obstacle based on the data received from the server 90, and performs a certain operation according to the obstacle.

In addition, the moving robot 100 may provide information on the detected obstacle to the terminal, and set a specific operation to be performed with respect to the obstacle in accordance with the data received from the terminal 80.

The terminal 80 may include an application for controlling the moving robot 100, display a map of a traveling zone to be cleaned by the moving robot 100 through execution of the application, and specify an area to clean a specific area on the map. The terminal may be, for example, a remote controller, a PDA, a laptop, a tablet PC, a smart phone, and the like equipped with an application for setting a map.

The terminal 80 sets information on an obstacle existing in the indoor area 1 and an operation thereof through execution of application. In this case, when the application is executed, the terminal 80 may access the server 90 through a network and receive obstacle information and operation information on the obstacle from the server.

In addition, the terminal 80 may change the operation of the moving robot 100 based on the obstacle information inputted from the moving robot 100.

The server 90 accumulates and stores obstacle information, and analyzes the obstacle information to determine the type of obstacle. In addition, the server 90 classifies the obstacle according to the type and sets the operation of the moving robot 100 for the obstacle.

The server 90 analyzes new obstacle information and updates pre-stored obstacle information. In addition, the server 90 receives and stores the operation information of the moving robot for the obstacle set or changed by the terminal 80, and matches the stored operation information to the pre-stored obstacle information to update the setting of the operation of the moving robot on the obstacle.

When the terminal 80 is connected, the server 90 provides the terminal 80 with data on the obstacle setting of the indoor area 1 and the operation of the moving robot 100 based on pre-stored data.

In addition, the server 90 analyzes the obstacle information received from the moving robot 100 and determines the type of obstacle based on the pre-stored data to transmit to the moving robot 100.

The moving robot 100 is connected with a communication device 70 to communicate with the server 90 via a network N.

In addition, the moving robot 100 may be connected to the terminal 80 via Wi-Fi, and may communicate through short-range wireless communication such as Bluetooth.

The communication device 70 is equipped with a protocol for network N connection to transmit and receive data of the moving robot through the network. The communication device 70 may be a router or a gateway. The network N is basically an internet network. In some cases, the network N may be a small scale network based on a moving robot or a home appliance, or may be a local network for a certain region.

Figure 4:
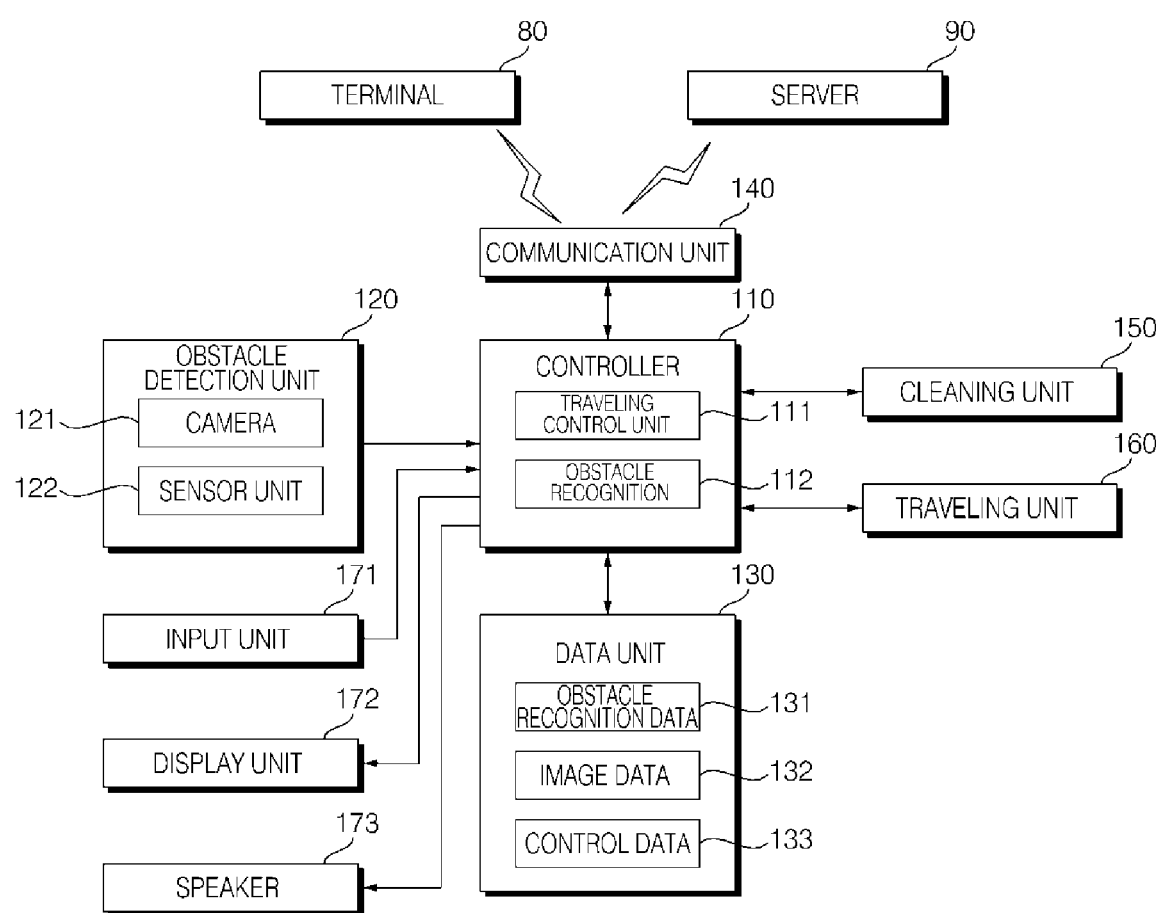
FIG. 4 is a block diagram schematically illustrating a configuration of a moving robot according to an embodiment of the present invention.

FIG. 4 is a block diagram schematically illustrating a configuration of a moving robot according to an embodiment of the present invention.

As shown in FIG. 4, the moving robot 100 includes a communication unit 140, an obstacle detection unit 120, a cleaning unit 150, a traveling unit 160, a data unit 130, and a controller 110 for controlling the overall operation.

In addition, the moving robot 100 may further include an input unit 171, 16 for inputting a turn-on/off or various commands, a display unit 172 for displaying an operation state or operation mode of the moving robot 100, and a speaker 173 for outputting a certain warning sound or an effect sound.

The input unit 171 includes at least one button, a switch, and a touch input unit, and receives various control commands necessary for the overall operation of the moving robot 100 and inputs the control commands to the controller 110.

The display unit 172 includes a display such as an LED and an LCD, and displays an operation mode, reservation information, a battery state, an operation state, an error state, and the like of the moving robot 100.

The speaker 173 outputs a certain sound effect, a warning sound, or a voice guidance corresponding to the operation mode, the reservation information, the battery state, the operation state, and the error state.

The traveling unit 160 includes at least one driving wheel (not shown) for moving the main body of the moving robot, and a driving motor (not shown) connected to the driving wheel to rotate the driving wheel. The driving wheel may be provided in the left and right sides of the main body respectively, and hereinafter, referred to as left and right wheels, respectively. The left wheel and the right wheel may be driven by one driving motor, but a left wheel driving motor for driving the left wheel and a right wheel driving motor for driving the right wheel may be provided if necessary. The traveling direction of the main body may be switched to the left or right side by making a difference between the rotation speeds of the left and right wheels.

The cleaning unit 150 may include a suction port (not shown) formed in the bottom portion of the main body of the moving robot to suck air, a suction device (not shown) that provides suction power so that air can be sucked through the suction port, a brush, and a dust container (not shown) for collecting dust sucked with air through the suction port.

The cleaning unit 150 may include a roll-typed main brush (not shown) having plumages exposed through the suction port, and an auxiliary brush (not shown) that is positioned in the front side of the bottom portion of the main body, and has a plumage formed of a plurality of feathers extending. The dusts are separated from the floor in the traveling zone by the rotation of the brushes, and the dusts separated from the floor is sucked through the suction port and collected in the dust container.

In addition, the cleaning unit 150 may further include a damp wiping unit (not shown) which is installed at the rear side of the bottom portion of the main body and in contact with the floor surface to wipe the floor surface with a damp cloth, and a water tank (not shown) for supplying water to the damp wiping unit.

The battery (not shown) supplies power necessary not only for a driving motor but also for the overall operation of the moving robot 100. When the battery is discharged, the moving robot 100 may travel to return to the charging stand for charging, and during such a return traveling, the moving robot 100 may detect the position of the charging stand by itself. The charging stand may include a signal transmitter (not shown) for transmitting a certain return signal. The return signal may be an ultrasonic signal or an infrared signal, but is not necessarily limited thereto.

The obstacle detection unit 120 includes a camera 121 for photographing a traveling zone and a sensor unit 122 for detecting an obstacle.

When detecting an obstacle located in the traveling direction through the sensor unit 122, the obstacle detection unit 120 operates the camera 121 to photograph the obstacle. The obstacle detection unit 120 inputs image data on the obstacle to be photographed and information on the position or movement of the obstacle detected by the sensor unit 122 to the controller 110.

The camera 121 may include at least one optical lens, an image sensor (e.g., a CMOS image sensor) configured to include a plurality of photodiodes (e.g. pixels) formed by light passed through the optical lens, and a digital signal processor (DSP) configured to form an image based on a signal outputted from photodiodes. The digital signal processor can generate not only a still image but also a moving image composed of frames formed of the still image.

The camera 121 is provided in the upper surface portion or the front surface portion of the moving robot 100 to acquire an image of the traveling direction. The camera 121, preferably, photographs the front direction of the moving robot 100, while photographing from the floor to a certain height. The camera 121 may photograph an area including the ceiling from the front surface portion according to the angle of view of the provided lens. In addition, the obstacle detection unit 120 may further include a lower camera for acquiring an image of the floor.

The type, position, and photographing range of the camera 121 are not necessarily limited thereto.

The sensor unit 122 is configured of a plurality of sensors for detecting a forward obstacle. The sensor unit 122 may use at least one of an infrared sensor, a laser sensor, an ultrasonic sensor that detect the forward, left, or right obstacle, and a 3D sensor that outputs an optical pattern. In addition, the sensor unit 122 may further include a cliff detection sensor for detecting the existence of a cliff on the floor in the traveling zone.

The data unit 130 records various types of information necessary for the control of the moving robot 100, and may include a volatile or nonvolatile recording medium. The recording medium stores data that can be read by a microprocessor, and may include a hard disk travel (HDD), a solid state disk (SSD), a silicon disk travel (SDD), a ROM, a RAM, a CD-ROM, a magnetic Tapes, floppy disks, an optical data storage device, and the like.

The data unit 130 stores obstacle recognition data 131 including feature information for obstacle recognition, image data 132 photographed through the camera 121 of the obstacle detection unit 120, and control data 133 for controlling the operation of the moving robot.

In addition, the data unit 130 may store a map of the cleaning area, store information on obstacle received from a server, and store motion data that allows the main body to perform a certain operation according to the type of obstacle.

The image data 132 stores all images photographed through the camera 121 as data. The obstacle recognition data 131 includes image data used for obstacle recognition among image data of the obstacle photographed by the camera 121 and recognition information for obstacle recognition received from the server. The motion data includes motion information related to the operation of the moving robot with respect to the recognized obstacle, e.g., traveling speed, traveling direction, avoiding, stopping, etc., and data related to effect sound, warning sound, and voice guidance outputted through the speaker 173.

The communication unit 140 includes a plurality of communication modules, and transmits and receives data to and from the server 90 through the communication device 70, and communicates with the terminal 80.

The communication unit 140 transmits information on the obstacle detected by the obstacle detection unit 120 to the server 90 through the communication unit 140, and receives data on the obstacle from the server. In addition, the communication unit 140 receives information on the obstacle existing in the traveling zone and corresponding operation information from the terminal 80, and transmits the operation data of the moving robot to the terminal 80.

The controller 110 controls the traveling unit 160 to allow the moving robot to travel in the traveling zone designated to be cleaned in the indoor area 1.

The controller 110 controls the traveling unit 160 and the cleaning unit 170 during traveling to absorb dust or foreign matter around the moving robot, thereby performing cleaning for the traveling zone. Accordingly, the cleaning unit 150 operates the brush to make it easy to suck the dust or foreign matter around the moving robot, and operates the suction device to suck the dust or foreign matter.

The controller 110 checks the charging capacity of the battery to determine a time to return to the charging stand. When the charging capacity reaches a certain value, the controller 110 stops the operation that is being performed and starts searching the charging stand to return to the charging stand. The controller 110 may output a notification about the charging capacity of the battery and a notification about the return to the charging stand.

The controller 110 processes the data inputted by the operation of the input unit 171 to set the operation mode of the moving robot, outputs the operation state through the display unit 172, and outputs warning sound, sound effect, and voice guidance according to the operation state, error state or obstacle detection through the speaker 173.

In addition, the controller 110 recognizes obstacle with respect to the obstacle detected by the obstacle detection unit 120, and performs a specified operation in correspondence with the obstacle. In this case, when the recognition of the obstacle is impossible, the controller 110 transmits the obstacle information to the server 90 through the communication unit 140, and when data related to the obstacle is received, accordingly performs a certain operation.

The controller 110 may recognize the obstacle based on the setting data for the traveling zone received from the terminal 80. The controller 110 performs a specific operation designated by the terminal with respect to the recognized obstacle, in accordance with the setting data received from the terminal 80.

The controller 110 includes an obstacle recognition unit 112 that recognizes an obstacle detected by the obstacle detection unit 120, and a traveling control unit 111.

The traveling control unit 111 controls the traveling unit 160 and the cleaning unit 150 according to a cleaning command so that the main body 10 sucks foreign matter while traveling the cleaning area and performs cleaning.

During traveling, the obstacle detection unit 120 detects an obstacle located in front of the main body, and inputs an obstacle detection signal. Accordingly, the traveling control unit 111 operates the camera 121 by applying a signal to the obstacle detection unit 120.

When the control signal is inputted from the controller 110 in response to the obstacle detection signal of the sensor unit 122, the camera 121 operates accordingly to photograph an obstacle in front of the camera 121. In addition, according to the setting, the camera 121 operates in response to the obstacle detection signal inputted from the sensor unit 122 and photographs the forward obstacle, even when a separate control signal is not inputted from the controller. That is, when an obstacle is detected by the sensor unit, the camera 121 immediately operates to photograph an obstacle in front of the camera 121.

The camera 121 photographs the front of the main body a set number of times, in response to the obstacle detection signal. The number of times of photographing may be changed according to a setting. In addition, the camera 121 may photograph a video.

When the obstacle detection signal is inputted, the traveling control unit 111 controls the traveling unit 160 to reduce the traveling speed of the main body, or to temporarily stop. In addition, the traveling control unit 111 may drive the camera 121 as described above, in response to the obstacle detection signal.

When image data photographed the obstacle by the camera 121 is inputted, the obstacle recognition unit 112 stores the image data in the data unit 130. Since the camera 121 photographs the forward obstacle a plurality of times, a plurality of image data are stored.

The obstacle recognition unit 112 analyzes the plurality of image data to determine whether the object to be photographed, i.e., the obstacle, can be recognized. At this time, the obstacle recognition unit 112 does not immediately determine the obstacle by analyzing the image data, but determines whether the image data is recognizable. The obstacle recognition unit 112 separates and discards the shaken image, the unfocused image, and the dark image that cannot distinguish the obstacle.

The obstacle recognition unit 112 selects a recognizable image, and transmits the image to the server 90 through the communication unit 140. The communicator 140 transmits at least one selected image data to the server 90.

The controller 110 filters the image data to separate the image data that can identify the obstacle and, among them, filters the data used for the obstacle recognition, and stores the image data as the obstacle recognition data. The controller 110 discards image data that is not used for obstacle recognition.

When the image data is received from the moving robot 100, the server 90 analyzes the image data, extracts the outline or shape of the photographed object, and compares the data with a pre-stored obstacle to determine the type of the obstacle. The server 90 first searches obstacle of a similar shape or color, and extracts and compares features from corresponding image data to determine the type of obstacle.

After determining the type of obstacle, the server 90 transmits data of the obstacle to the moving robot 100.

The obstacle recognition unit 112 stores data on the obstacle received from the server through the communication unit as the obstacle recognition data in the data unit 130. If the type of obstacle is determined by the server, the obstacle recognition unit 112 performs a corresponding operation. The traveling control unit 111 controls the traveling unit to avoid, approach, or pass the obstacle in accordance with the type of the obstacle and, in some cases, outputs a certain sound effect, warning sound, and voice guidance through the speaker.

As described above, the obstacle recognition unit classifies the image data according to whether the image data is recognizable, and transmits the image data to the server, thereby recognizing the type of the obstacle according to a response of the server. In addition, the obstacle recognition unit may store the data for obstacle recognition, with respect to the selected obstacle among a plurality of obstacles, and may recognize the obstacle based on the obstacle recognition data even if the image data is not transmitted to the server.

Since the data unit 130 has a limit in storage capacity, the controller 110 may store information on some selected obstacles as obstacle recognition data. For example, the controller 110 may store obstacle recognition data in the data unit with respect to the obstacle selected through the terminal 80 or an obstacle having a large number of detections based on the number of detections.

Accordingly, the obstacle recognition unit 112 may store, in the data unit, an obstacle existing in the cleaning area or an obstacle that is repeatedly detected, and thus may immediately perform a corresponding operation when obstacle is detected.

The obstacle recognition unit 112 analyzes the obstacle information inputted from the obstacle detection unit 120 to recognize the obstacle based on the obstacle recognition data of the data unit, and determines the type of the obstacle. The obstacle recognition unit 112 determines the existence of the obstacle and the position of the obstacle in accordance with the data inputted from the sensor unit 122, and detects the movement of the obstacle.

In addition, the obstacle recognition unit 112 determines the type of obstacle by analyzing the image data of the obstacle photographed by the camera 121. The obstacle recognition unit 112 analyzes the image data, extracts the outline of the obstacle, recognizes the obstacle based on the shape, and determines the type of the obstacle. In addition, the obstacle recognition unit 112 may determine the type of the obstacle according to the color and size of the obstacle, based on the shape. In addition, the obstacle recognition unit 112 may determine the type of obstacle based on the shape and movement of the obstacle.

The obstacle recognition unit 112 classifies a person, an animal, and a thing, based on the obstacle information. The obstacle recognition unit 112 classifies the types of obstacles into a general obstacle, a dangerous obstacle, a biological obstacle, and a floor obstacle, and determines the type of detailed obstacle for each classification.

When the type of obstacle is recognized, the traveling control unit 111 controls the traveling unit 160 in accordance with the type of obstacle so that the main body 10 performs a certain operation.

For example, the traveling control unit 111 allows the main body 10 to stop, decelerate, accelerate, reverse travel, U-turn, and to change traveling direction, in accordance with the type of obstacle, and not to approach the obstacle more than a certain distance, and to stand by for a certain time. In addition, the traveling control unit 111 may output a specified sound through the speaker depending on the obstacle, and may output sound along with a specified operation.

When detecting an obstacle through the obstacle detection unit during cleaning, the moving robot 100 photographs the obstacle by using a camera and transmits image data of the obstacle to the server.

The moving robot 100 generates a plurality of image data with respect to the obstacle, and selects image data that can be identified among the plurality of image data and transmits to the server 90. At this time, image data that cannot be identified is discarded.

The moving robot 100 determines whether the image data can be identified based on the focus, the sharpness, and brightness of the photographed image data. In addition, the moving robot 100 may select image data based on whether an obstacle is photographed. That is, when only the background is photographed in the image data, it is determined that the image data cannot be identified and corresponding image data is discarded.

The server 90 analyzes a plurality of image data received from the moving robot to determine the type of obstacle, and generates obstacle recognition data including feature information for recognizing the obstacle. In addition, the server 90 may generate and store motion information for setting an operation corresponding to the obstacle, and transmit the motion information to the moving robot 100.

The moving robot 100 stores data on the received obstacle as obstacle recognition data and motion data, and recognizes the obstacle based on the stored data when detecting the same obstacle again.

The moving robot 100 performs a designated motion based on the motion data, in accordance with the recognized obstacle. The moving robot 100 may perform an operation for traveling depending on an obstacle, and a motion for outputting a certain sound.

The terminal 80 executes an application, receives and stores obstacle data from the server 90, and inputs a command so that the moving robot 100 cleans a specific traveling zone of the indoor area based on the obstacle data.

The terminal 80 transmits obstacle setting data to the moving robot 100 by designating an obstacle existing in the traveling zone and a motion for the obstacle (S4).

In this case, the terminal 80 inputs the setting for the traveling zone based on the obstacle data (S6) related to obstacle and motion that are previously stored or received from the server 90. The terminal 80 periodically connects to the server 90 (S5), receives data on obstacle and motion (S6), and updates the stored data.

The moving robot 100 performs cleaning for the traveling zone based on a cleaning command and obstacle setting data received from the terminal 80. The moving robot 100 transmits data on an operation mode, an operation state, an error state, and the like to the terminal 80 during cleaning (S3).

When the cleaning is completed, the moving robot 100 stores cleaning record, stores information on the obstacle detected during the cleaning and corresponding motion and information changed by the terminal, and transmits to the server 90.

The server 90 analyzes the changed data, and updates pre-stored data.

Figure 5:
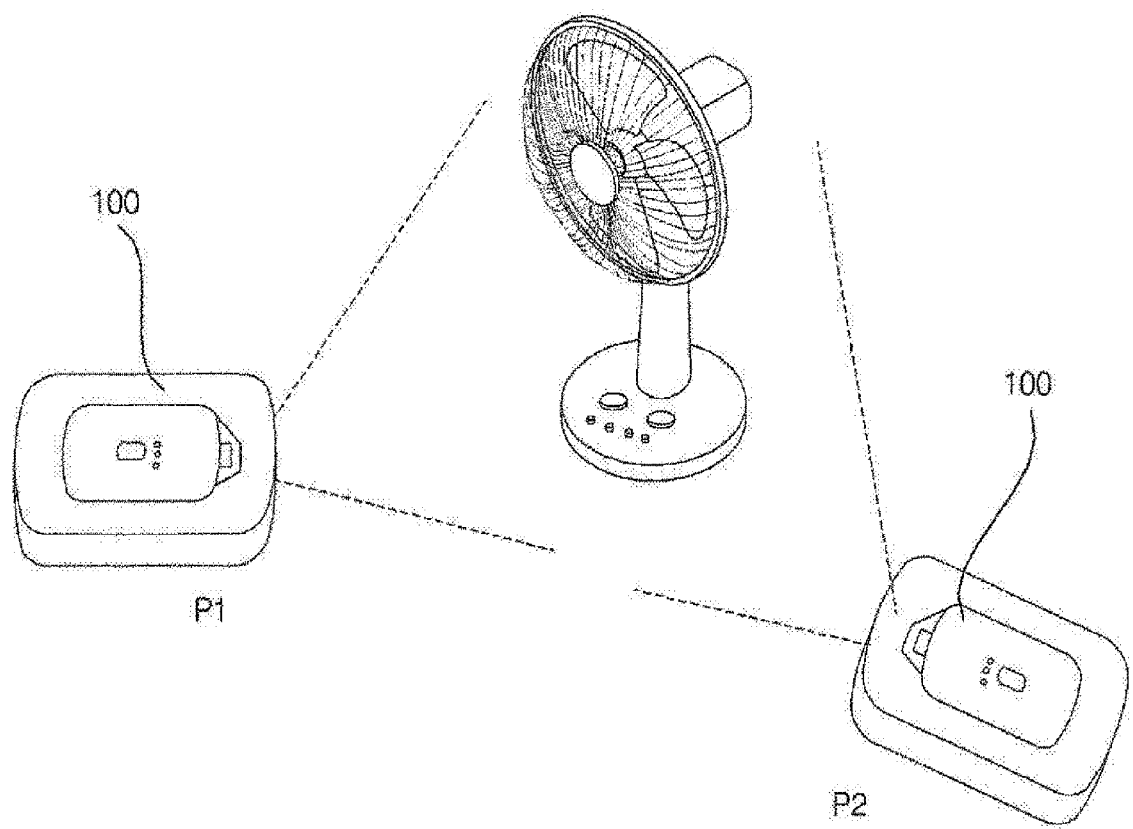
FIG. 5 is a view for explaining a method for detecting an obstacle of a moving robot according to the present invention.

FIG. 5 is a view for explaining a method for detecting an obstacle of a moving robot according to the present invention.

As shown in FIG. 5, the moving robot 100 detects an obstacle located in front of the main body 10 while traveling.

The moving robot 100 first detects the existence of an obstacle located in the traveling direction or in the front through the obstacle detection unit 120. The sensor unit 122 includes a plurality of sensors, and when at least one sensor detects an obstacle, the sensor unit 122 inputs an obstacle detection signal to the controller. The controller 110 drives the camera 121 in response to the obstacle detection signal inputted from the sensor unit 122 so that the camera photographs an image of the obstacle.

When the obstacle detection signal is inputted, the camera 121 operates in response to the obstacle detection signal and photographs the front.

The camera 121 photographs the obstacle consecutively in a certain number of times, in response to the obstacle detection signal. The number of consecutive photographing and the photographing interval of the camera 121 may be changed according to setting.

The image photographed from the camera 121 is stored in the data unit as a plurality of image data through an image processor (not shown).

The obstacle recognition unit 112 analyzes a plurality of image data of a single obstacle and filters the image data depending on whether obstacle can be recognized.

If the obstacle is not normally photographed due to the movement of the obstacle or the movement of the main body 10 during photographing, for example, if the image of the obstacle to be photographed cannot be recognized due to the shaking of the obstacle, the obstacle recognition unit 112 selects only the image data that is normally photographed, while excluding the image data cannot be recognized due to unfocused image.

The obstacle recognition unit 112 may determine whether the image data can be identified based on the brightness, the sharpness of the image data, and the moving speed of the main body 10. The obstacle recognition unit 112 determines the brightness of the image data based on the brightness value of the plurality of pixel values of the image data to distinguish between overexposure, underexposure, and normal exposure. In addition, when the moving speed of the main body is greater than a set speed, the obstacle recognition unit 112 may determine that there is a shake in the photographed image, and determine whether the image data can be identified by determining the sharpness of the image data.

The controller 110 transmits the selected image data to the server 90 through the communication unit 140.

The server 90 stores and analyzes the image data received from the moving robot 100, extracts the outline of the photographed object, i.e., of the obstacle, and searches the similar type of data from the database to determine the type of the obstacle.

The server 90 stores a plurality of image data with respect to a single obstacle, extracts a feature of a specific obstacle, and stores it in a database. The server 90 determines the type of obstacle by analyzing the image data received from the moving robot 100 and comparing it with pre-stored data.

The server 90 transmits the type of obstacle and the obstacle data related thereto to the moving robot 100.

When the type of the obstacle and the obstacle data are received from the server 90 through the communication unit, the controller 110 stores the received data in the data unit 130.

The controller 110 determines the type of the obstacle based on the received data on the obstacle, and controls the traveling unit 160 in accordance with the type of the obstacle.

The obstacle recognition unit 112 may determine whether the obstacle is a dangerous obstacle, in accordance with the received type of the obstacle. When the obstacle is a dangerous obstacle, the obstacle recognition unit 112 applies a signal for the dangerous obstacle to the traveling control unit.

When the obstacle is a dangerous obstacle, the traveling control unit 111 controls the traveling unit 160 to avoid the obstacle without approaching the obstacle.

The traveling control unit 111 sets the traveling operation in accordance with the type of obstacle, even in the case of a dangerous obstacle. If it is not a dangerous obstacle, the traveling control unit 111 controls the traveling unit to avoid after approaching the obstacle in a certain distance.

The traveling control unit 111 changes the traveling direction to avoid the obstacle without approaching the obstacle. The traveling control unit 111 may set the approach distance differently according to the type of obstacle.

When the detected obstacle is not a dangerous obstacle, the traveling control unit 111 sets an operation according to the type of obstacle or an operation mode of the moving robot.

If it is not a dangerous obstacle during cleaning, it may be avoided after contacting the obstacle, or avoided after the obstacle approaches in a certain distance.

Even in the case of the same obstacle, the moving robot 100 photographs different image data according to the direction of contact with the obstacle.

With respect to a first obstacle, the image data photographed at a first point P1 and the image data photographed at a second point P2 may have a different shape. Accordingly, although they are the same first obstacle, the moving robot may recognize as a different obstacle.

Accordingly, the moving robot 100 transmits a plurality of image data to the server, and the server determines the type of the obstacle by analyzing the plurality of image data and extracting the shape and feature of the obstacle.

In accordance with the data received from the server, the moving robot 100 may determine the type of obstacle and recognize that the obstacle detected at the first point and the obstacle detected at the second point are the same first obstacle.

Figure 6:
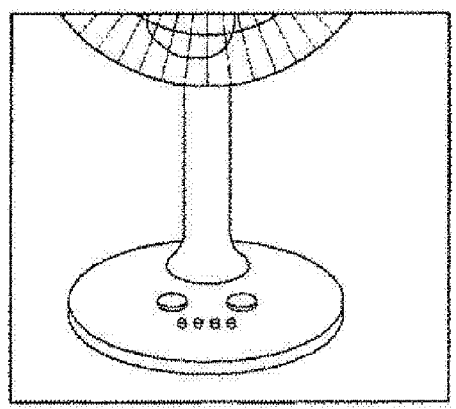
FIG. 6 is a view illustrating an example of data for the obstacle of FIG. 5.
Figure 6:
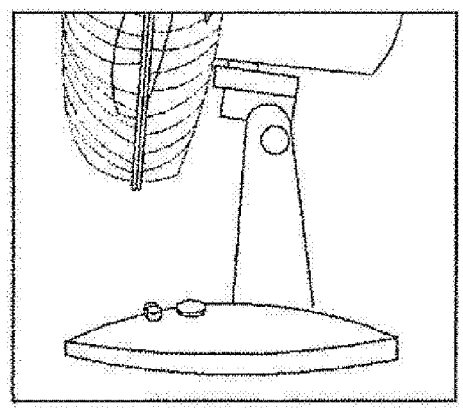
Figure 6:
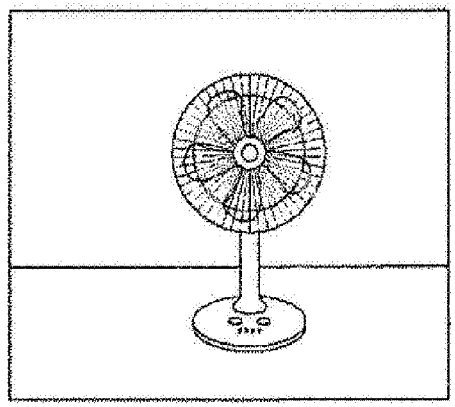
Figure 6:
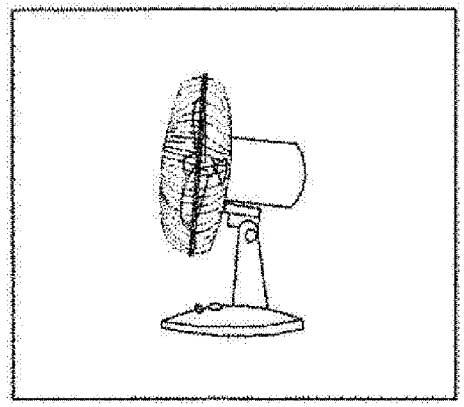

FIG. 6 is a view illustrating an example of data for the obstacle of FIG. 5.

As described above, the image data to be photographed is different depending on the position and direction of contact with the obstacle.

For example, when an electric fan is located in the traveling direction of the moving robot 100, the moving robot 100 detects the electric fan while traveling and photographs image data of the obstacle.

In this case, since the position and direction of contact with the electric fan are different according to the traveling direction of the moving robot 100, each image data to be photographed has a different shape.

When the moving robot 100 travels toward the front of the electric fan, and approaches the electric fan within a certain distance, the camera 121 photographs the electric fan which is a detected obstacle. Accordingly, the moving robot 100 stores the image data as shown in FIG. 6a. Since the moving robot 100 approaches the electric fan, which is an obstacle, within a certain distance, the front of the electric fan is photographed, but a part of the electric fan is photographed as image data from the front.

In addition, when traveling toward the side of the electric fan of the moving robot 100, and approaches within a certain distance, as shown in FIG. 6b, the image data photographed a part of the side of the electric fan is stored.

Meanwhile, when the moving robot 100 travels toward the front of the electric fan, and detects the electric fan which is an obstacle at a position separated by a certain distance or more, as shown in FIG. 6c, image data including the front and the overall shape of the electric fan is stored.

In addition, when the moving robot moves toward the side of the electric fan of 100 and detects the electric fan as an obstacle in a certain distance away, as shown in FIG. 6d, the image data photographed the side, and the overall shape of the electric fan is stored.

As described above, the moving robot 100 photographs image data having a different shape even in the case of the same obstacle which is different depending on the positional relationship with the obstacle or the traveling direction. Accordingly, the moving robots may recognize as a different obstacle although they are the same first obstacle.

Accordingly, the moving robot 100 transmits a plurality of image data to the server, and the server determines the type of the obstacle by analyzing the plurality of image data and extracting the shape and feature of the obstacle.

Figure 7:
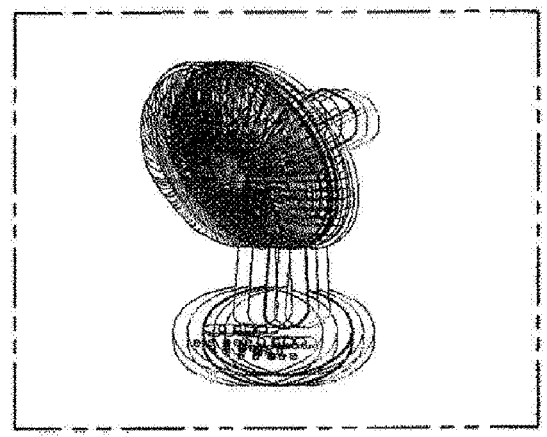
FIGS. 7 and 8 are views for explaining an image data filtering method of an obstacle of a moving robot according to an embodiment of the present invention.
Figure 7:
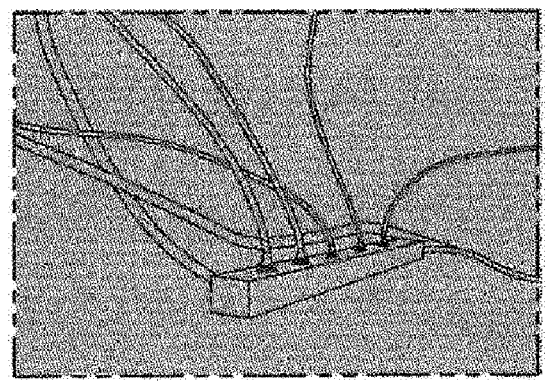
Figure 8:
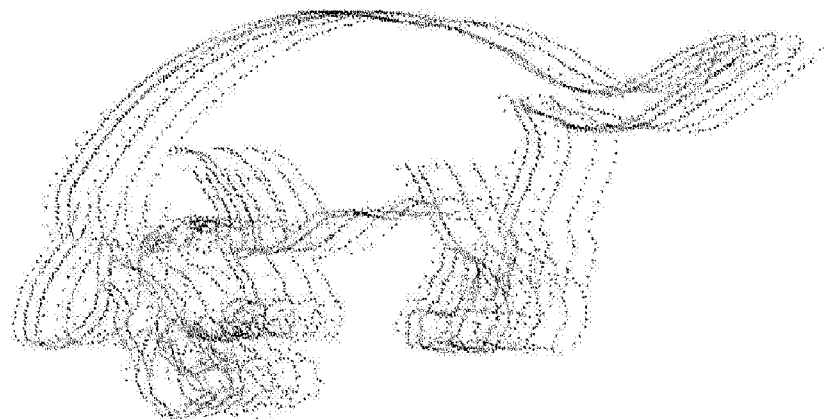
Figure 8:
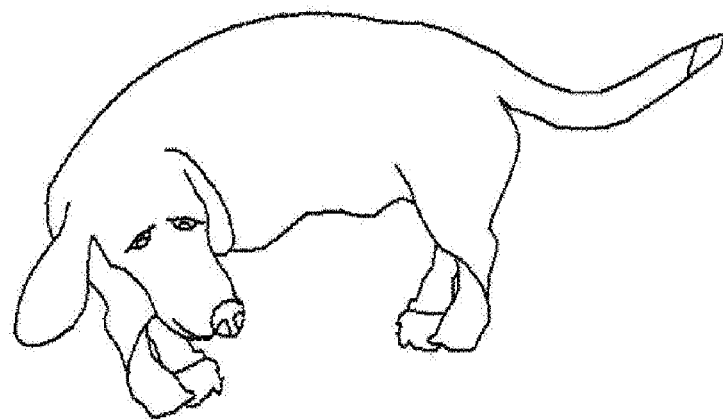

FIGS. 7 and 8 are views for explaining an image data filtering method of an obstacle of a moving robot according to an embodiment of the present invention.

The moving robot 100 selects identifiable image data from the plurality of image data that is photographed through the camera 121 to determine the type of the obstacle and transmits the selected image data to the server 90.

As shown in FIG. 7a, when the main body is shaken due to the vibration generated while the main body 10 moves or the unevenness of the floor, the camera provided in the main body is also shaken, so that obstacles is not clearly photographed, and the image data may be photographed based on shaking phenomenon.

Among the plurality of image data, the obstacle recognition unit 112 discards the image data in which the obstacle is not clearly photographed in a shaken state.

Since the camera 121 photographs a plurality of images in a short time, the obstacle recognition unit 112 discards some of the plurality of image data photographing the same obstacle and selects some of the image data.

In addition, as shown in FIG. 7b, the image data having a low brightness may be photographed according to the brightness of the area where the camera photographs the obstacle by detecting the obstacle and the position of the main body 10.

The obstacle recognition unit 112 determines that the obstacle is difficult to identify when the brightness of the image data is dark at a certain value or less and discards corresponding image data.

In order to prepare a case where it is difficult to identify the obstacle due to the brightness, the controller 110 detects the brightness of the traveling zone and transmits a lighting operation signal to a lighting device installed in the area through the communication unit. In this case, the lighting device is a device having a communication function, and a device that can turn on/off the lighting according to the lighting operation signal and adjust the brightness is used. In some cases, the lighting operation signal may be transmitted to the terminal to adjust the on/off and the brightness of the lighting.

Even if the lighting is turned on in the area, since it is dark due to the shadow of a desk under the desk, the photographed image data also becomes an underexposed image having brightness equal to or lower than a certain value.

The obstacle recognition unit 112 may determine the brightness of the image data by calculating an average of brightness value of pixels of the image data.

In addition, the obstacle recognition unit 112 determines that the image data cannot be identified, if the brightness is greater than or equal to a certain value. The obstacle recognition unit 112 discards the image data, because the obstacle is not shown clearly due to the overexposure image data or the brightness.

The obstacle recognizing unit 112 selects the identifiable image data from among the photographed image data and transmits to the server, even when the object to be photographed, i.e., the obstacle, is a moving obstacle, even if the main body 10 is in a stable state and there is no shaking.

When the pet is detected as an obstacle, since the pet is a moving obstacle, as shown in FIG. 8a, in some cases, a clear image cannot be photographed due to the movement of the pet.

Accordingly, the obstacle recognition unit 112 discards the image data in which afterimage remains among the plurality of image data.

Meanwhile, as shown in FIG. 8b, the obstacle recognition unit 112 transmits the identifiable image data to the server, if an identifiable image data exists among the plurality of image data.

In order to correspond to such a moving obstacle, the controller 110 controls the camera to photograph a plurality of image data with respect to a single obstacle.

Figure 9:
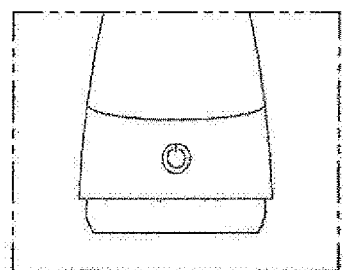
FIG. 9 is a view illustrating an example of data for obstacle recognition of a moving robot according to an embodiment of the present invention.
Figure 9:
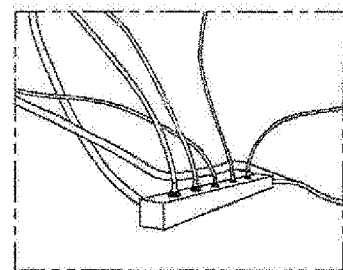
Figure 9:
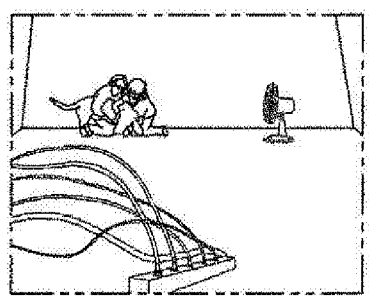
Figure 9:
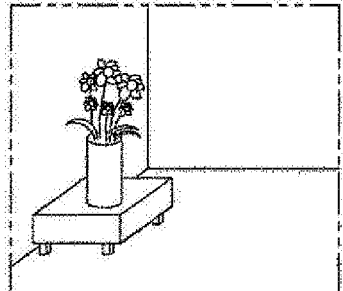

FIG. 9 is a view illustrating an example of data for obstacle recognition of a moving robot according to an embodiment of the present invention.

As shown in FIG. 9, the moving robot 100 filters the photographed image data and transmits to the server, and recognizes the obstacle based on the data related to the obstacle received from the server. The moving robot 100 performs a certain operation according to the type of the recognized obstacle.

The obstacle recognition unit 112 determines whether it is a dangerous obstacle depending on the type of obstacle, and the traveling control unit 111 allows the main body to perform a certain operation in accordance with the determination result.

As shown in FIG. 9a, when the obstacle is a home appliance based on data received from a server, the moving robot 100 may not approach the home appliance within a certain distance. While the cleaning is being performed, the traveling control unit 111 approaches the obstacle and performs cleaning even when an obstacle is detected.

However, in the case of a home appliance, since it may be damaged due to a collision, Since the home appliance may be damaged due to the collision, it avoids a collision after approaching a certain distance.

As shown in FIG. 9a, when the obstacle is determined to be a multi-tap or a wire, the moving robot 100 determines that the obstacle is a dangerous obstacle and does not approach a certain distance or more and avoids it. When the moving robot 100 approaches and is caught between the wires, a situation in which it cannot escape may occur. In addition, since a plug may be removed due to an escape attempt of the moving robot 100, the moving robot 100 does not approach a certain distance or more and avoids the obstacle.

As shown in FIG. 9c, when a plurality of obstacles are detected, the moving robot 100 avoids based on the nearest obstacle. Since the near obstacle is the wire, the moving robot 100 searches and avoids the path where the wire is not located. In addition, by recognizing a moving obstacle and a home appliance such as an electric fan, the traveling path can be set at a long distance to approach or avoid the obstacle.

As shown in FIG. 9d, if the obstacle is a flowerpot, the moving robot 100 does not approach a certain distance or more and avoids the flowerpot because the flowerpot may be broken due to a collision.

Figure 10:
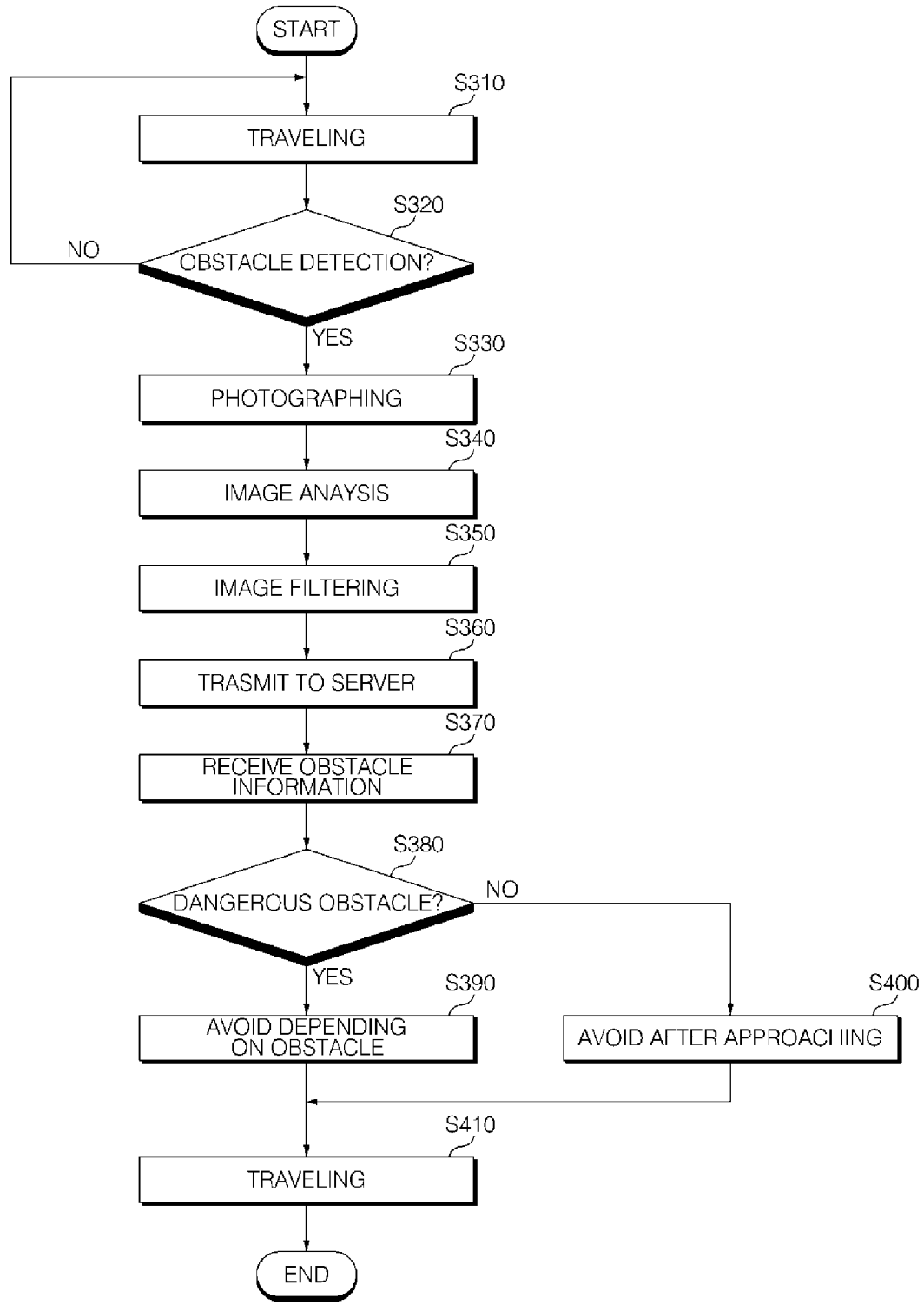
FIG. 10 is a flowchart illustrating a control method of a moving robot according to an embodiment of the present invention.

FIG. 10 is a flowchart illustrating a control method of a moving robot according to an embodiment of the present invention.

As shown in FIG. 10, when a cleaning command is inputted from the terminal 80 or the input unit 16 (171), the moving robot 100 performs cleaning while traveling the designated cleaning area (S310). When a cleaning command is inputted through the terminal, information related to an obstacle located in the cleaning area may be inputted.

When the obstacle is detected through the sensor unit 122 of the obstacle detection unit 120 (S310), the camera 121 operates to photograph the obstacle (S330). When the obstacle detection signal is inputted, the traveling control unit 111 reduces the traveling speed of the main body or controls the traveling unit 160 to temporarily stop.

The camera 121 photographs the obstacle at least twice. The camera 121 may operate by a control signal of the controller 110 and may operate in response to an obstacle detection signal of the sensor unit.

The controller 110 receives image data from the camera 121 and stores the image data in the data unit 130. The obstacle recognition unit 112 analyzes the image data inputted from the camera, analyzes the image of the image data to distinguish the image data that can be identified from the image data that cannot be identified, and filters the image data (S350). For example, the obstacle recognition unit 112 determines whether the obstacle can be identified based on the brightness, sharpness, and shaking of the image data.

The controller 110 transmits the filtered image data, i.e., the image data determined to be identifiable to the server 90 through the communication unit 140. The controller 110 discards unidentifiable image data.

When the image data is received from the moving robot 100, the server 90 analyzes the image data, and extracts the outline of the photographed object, i.e., the obstacle, analyzes the shape, and compares the image data with pre-stored data to determine the type of the obstacle.

The server 90 analyzes the received obstacle information to compare with pre-stored data, searches for a new obstacle to recognize the obstacle, and determines the type of the obstacle. In the case of a new obstacle, the server 90 registers data on the new obstacle. Since the image data appears differently depending on the photographing angle of the image data or the position of the obstacle that is an object, the same obstacle may be recognized differently or may not be recognized, so that the server 90 accumulates and stores a plurality of image data for a corresponding obstacle.

When the type of the obstacle is determined, the server 90 transmits data on the type of the obstacle to the moving robot 100 as the obstacle information. When it is set to perform a specific operation with respect to the determined obstacle, the server 90 may also transmit information on the designated operation.

The controller 110 receives the obstacle information transmitted from the server (S370). The controller 110 may transmit the received information on the obstacle to the terminal 80 through the communication unit 140.

The obstacle recognition unit 112 determines whether the detected obstacle is a dangerous obstacle depending on the received obstacle information (S380).

If it is a dangerous obstacle, the traveling control unit 111 avoids the obstacle depending on the type of the obstacle (S390), and if it is not a dangerous obstacle, the traveling control unit 111 controls the traveling unit 160 to avoid the obstacle after approaching a certain distance. (S400).

For example, due to the dangerous obstacle, the traveling control unit 111 may avoid it immediately after detecting the dangerous obstacle, or may avoid it without approaching 30 cm or more from the obstacle. In addition, in the case of a general obstacle, the traveling control unit 111 may control the traveling unit to perform cleaning after approaching the obstacle. In addition, the controller 110 may output a certain sound effect or warning sound through the speaker 173 in accordance with the type of obstacle.

The traveling unit 160 travels by approaching or avoiding the obstacle (S410). Accordingly, the moving robot 100 performs a certain operation or outputs a certain sound in accordance with the recognized obstacle.

Figure 11:
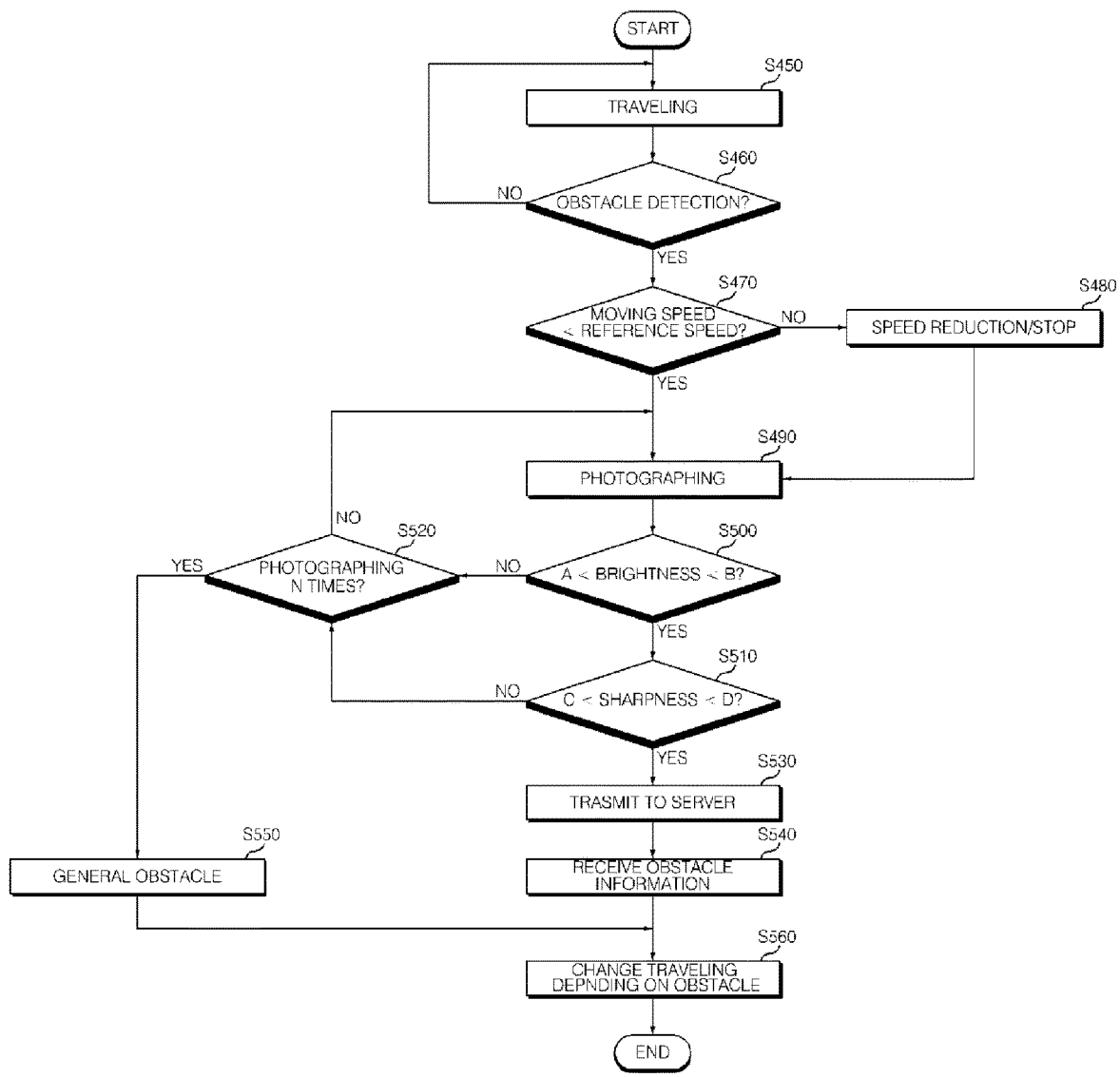
FIG. 11 is a flowchart illustrating a data processing method for obstacle determination of a moving robot according to an embodiment of the present invention.

FIG. 11 is a flowchart illustrating a data processing method for obstacle determination of a moving robot according to an embodiment of the present invention.

As shown in FIG. 11, the moving robot 100 controls the traveling unit 160 to perform a designated cleaning for the cleaning area or to travel to a destination (S410).

When the obstacle is detected through the sensor unit 122 of the obstacle detection unit 120 (S460), the moving robot 100 operates the camera.

In addition, when the obstacle is detected through the sensor unit, the traveling control unit 111 determines whether the moving speed of the main body is less than a reference speed (S470). If the moving speed is higher than or equal to the reference speed, the traveling control unit 111 controls the traveling unit 160 to reduce the traveling speed of the main body or to temporarily stop (S480).

When the obstacle is photographed while the main body 10 is traveling at a speed higher than or equal to a set speed, the traveling control unit 111 may photograph an unfocused image or shaken image. Therefore, the traveling control unit 111 may photograph the image data by reducing or stopping the speed.

When the moving speed of the main body is less than the reference speed, the camera 121 photographs the obstacle (S490). The camera 121 photographs the obstacle at least twice to generate a plurality of image data. The camera 121 may operate by a control signal of the controller 110 and may operate in response to an obstacle detection signal of the sensor unit.

The controller 110 filters the photographed image data according to whether an obstacle can be identified. The obstacle recognition unit 112 determines the brightness and the sharpness of the image data and filters the image data.

The obstacle recognition unit 112 determines the brightness of the image data and determines as a normal brightness when it is greater than a setting brightness, e.g., a reference value a, and smaller than a reference value b, thereby determining that corresponding image data can be identified with respect to an obstacle (S550).

Meanwhile, when the brightness of the image data is less than or equal to the reference value a, the obstacle recognition unit 112 determines as an underexposure, and when it is greater than or equal to the reference value b, the obstacle recognition unit 112 determines as an overexposure and determines that the obstacle cannot be identified.

The obstacle recognition unit 112 may calculate an average of brightness values of each pixel of the image data and compare the brightness with the reference value.

In addition, the obstacle recognition unit 112 analyzes the image data, compares the sharpness with the reference values c, d, and determines as a normal data when the sharpness is larger than the reference value c and smaller than the reference value d, thereby determining that it is identifiable image data with respect to the obstacle (S510).

While the camera is photographing an obstacle, even if the speed of the main body is controlled by the traveling control unit, there may be shaking in the image data according to the state of the floor surface, and if the obstacle is a moving obstacle like a pet dog, the shaken image may be taken. Accordingly, the obstacle recognition unit 112 determines the sharpness of the image data and filters the image data.

In addition, when the image data is photographed while the moving speed is higher than or equal to the reference speed, the obstacle recognizing unit determines it as an unidentifiable image data.

The controller 110 transmits the image data determined to be identifiable to the server 90 through the communication unit 140 (S530). The controller 110 discards unidentifiable image data.

When the obstacle information is received from the server (S540), the controller 110 stores the obstacle information in the data, and the obstacle recognition unit 112 determines whether the obstacle is a dangerous obstacle.

In accordance with the determination result of the dangerous obstacle and the general obstacle, the traveling control unit 111 controls the traveling unit 160 to avoid or approach the obstacle according to the type of obstacle (S560).

Meanwhile, if it is determined, by the obstacle recognition unit 112, that all the image data is unidentifiable, the controller 110 may control the camera 121 to perform additional photographing (S520).

When the camera photographs the obstacle less than a set number of times n (S520), the controller 110 controls the camera to additionally photograph the obstacle (S490).

Meanwhile, if the camera photographs the obstacle the set number of times or more, the controller 110 determines that the obstacle is unidentifiable even if additional photographing is performed. Accordingly, the controller 110 sets the detected obstacle as a general obstacle (S550).

The moving robot determines that the type of obstacle cannot be recognized even when image data is transmitted to the server as the image data has an exposure problem or is not clear, and set the obstacle to a general obstacle to continue traveling.

As the detected obstacle is set to the general obstacle, the traveling control unit 111 controls the traveling unit 160 to approach the obstacle based on the operation for the general obstacle (S560).

Therefore, the moving robot 100 photographs the detected obstacle, analyzes and filters the photographed image data and transmits to the server, so that unnecessary data transmission can be prevented and the load of the server can be reduced, thereby enabling quick obstacle determination through the server. The moving robot can perform a designated operation according to the type of obstacle determined through the server, and can effectively perform cleaning without damaging the obstacle or the moving robot.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

The invention claimed is:

1. A moving robot comprising:
an obstacle sensor configured to be provided at a front side of a main body, and to detect an obstacle located in a traveling direction;
a camera configured to photograph the obstacle, when the obstacle is detected by the obstacle sensor;
a controller configured to control a certain operation to be performed in accordance with the obstacle;
a traveling unit configured to perform a designated operation according to a control command of the controller; and
a communication unit configured to communicate with a server,
wherein the controller is configured to analyze a plurality of image data of the obstacle inputted from the camera to determine whether the obstacle can be identified and to filter the image data, to transmit the filtered image data among the plurality of image data to the server through the communication unit, and to control the traveling unit in accordance with obstacle information received from the server,
wherein the controller is configured to:
discard the image data when the image data can not identify the obstacle, after analyzing the image data, control the camera to photograph the obstacle again, determine the obstacle as a general obstacle, when the image data of the obstacle cannot be identified, after the camera photographs the obstacle again a certain number of times or more; and
continue traveling in response to the general obstacle.

2. The moving robot of claim 1, wherein the controller comprises:
a traveling control unit configured to control the traveling unit in accordance with the obstacle information; and
an obstacle recognition unit configured to analyze the image data to determine whether the obstacle can be identified, and to filter the image data.

3. The moving robot of claim 2, wherein the obstacle recognition unit determines whether the obstacle can be identified in accordance with a brightness and a sharpness of the image data, and filters the image data.

4. The moving robot of claim 3, wherein the obstacle recognition unit determines that the image data is normal data, when the brightness of the image data is greater than a first reference value and less than a second reference value,
determines that the image data is unidentifiable data due to underexposure when the brightness of the image data is less than or equal to the first reference value, and
determines that the image data is unidentifiable data due to overexposure when the brightness of the image data is greater than or equal to the second reference value.

5. The moving robot of claim 4, wherein the obstacle recognition unit calculates an average of brightness value of a plurality of pixels included in the image data and compares the average with the first reference value and the second reference value.

6. The moving robot of claim 3, wherein the obstacle recognition unit determines that the image data is normal data, when the sharpness of the image data is greater than a third reference value and less than a fourth reference value, and
determines that the image data is unidentifiable data as the image data is an unfocused image or a shaken image, when the sharpness of the image data is less than or equal to the third reference value or more than or equal to the fourth reference value.

7. The moving robot of claim 2, wherein the obstacle recognition unit determines whether the obstacle is a dangerous obstacle in accordance with the obstacle information,
wherein the traveling control unit allows the moving robot to avoid the obstacle by setting a traveling path so as not to approach the obstacle more than a certain distance, when the obstacle is a dangerous obstacle.

8. The moving robot of claim 2, wherein, when the obstacle is detected by the obstacle sensor, the traveling control unit controls the traveling unit to reduce the traveling speed of the main body or to stop for a certain time.

9. The moving robot of claim 2, wherein the obstacle recognition unit determines that the image data is unidentifiable data, when the image data is photographed through the camera in a state where a traveling speed of the main body is equal to or more than a reference speed.

10. The moving robot of claim 2, wherein the obstacle recognition unit classifies the obstacle into a general obstacle, a dangerous obstacle, a biological obstacle, and a floor obstacle to determine a type of the obstacle, in accordance with the obstacle information, and
wherein the traveling control unit controls the traveling unit to perform a combination operation of at least one of stop, deceleration, acceleration, reverse traveling, standby, change of traveling direction, and prohibition of short-range approach, in accordance with the obstacle information.

11. The moving robot of claim 1, wherein, when the obstacle is detected by the obstacle sensor, the camera photographs the obstacle at least twice with respect to the obstacle and inputs the image data.

12. A method of controlling a moving robot, the method comprising:
- detecting an obstacle, while the robot travels a designated traveling zone and performs cleaning;
- photographing the obstacle through a camera, when the obstacle is detected;
- analyzing image data of the obstacle to determine whether the obstacle can be identified;
- transmitting the image data to a server, when the image data is normal so that the obstacle can be identified; and
- performing a designated operation for the obstacle, in accordance with obstacle information, when the obstacle information is received from the server,
- discarding the image data when the image data cannot identify the obstacle, after analyzing the image data;
- photographing the obstacle again;
- determining the obstacle as a general obstacle, when the image data of the obstacle cannot be identified, after the camera photographs the obstacle again a certain number of times or more; and
- continuing traveling in response to the general obstacle.

13. The method of claim 12, further comprising reducing a traveling speed of the robot or stopping for a certain time, when the obstacle is detected.

14. The method of claim 13, further comprising:
- determining that the image data is normal data, when a sharpness of the image data is greater than a third reference value and less than a fourth reference value; and
- determining that the image data is unidentifiable data as the image data is an unfocused image or a shaken image, when the sharpness of the image data is less than or equal to the third reference value or more than or equal to the fourth reference value.

15. The method of claim 12, wherein analyzing image data comprises determining whether the obstacle can be identified in accordance with a brightness and a sharpness of the image data, and filtering the image data.

16. The method of claim 12, further comprising:
- determining that the image data is normal data, when brightness of the image data is greater than a first reference value and less than a second reference value,
- determining that the image data is unidentifiable data due to underexposure when the brightness of the image data is less than or equal to the first reference value, and
- determining that the image data is unidentifiable data due to overexposure when the brightness of the image data is greater than or equal to the second reference value.

17. The method of claim 12, further comprising determining that the image data is unidentifiable data, when the image data is photographed through the camera in a state where a traveling speed of the robot is equal to or more than a reference speed.

18. The method of claim 12, further comprising:
- determining whether the obstacle is a dangerous obstacle in accordance with the obstacle information received from the server; and
- avoiding the obstacle by setting a traveling path so as not to approach the obstacle more than a certain distance, when the obstacle is a dangerous obstacle.

* * * * *